United States Patent [19]

Goldner et al.

[11] 4,141,586
[45] Feb. 27, 1979

[54] VEHICLE SEAT

[75] Inventors: Walther Göldner, Ebersbach; Helmut Wall, Kirchheim/Teck, both of Fed. Rep. of Germany

[73] Assignee: Recaro GmbH & Co., Kirchheim/Teck, Fed. Rep. of Germany

[21] Appl. No.: 843,873

[22] Filed: Oct. 20, 1977

[30] Foreign Application Priority Data

Oct. 28, 1976 [DE] Fed. Rep. of Germany ....... 2648951

[51] Int. Cl.² ............... A47B 39/00; A47C 7/62; A47C 7/54
[52] U.S. Cl. .................................. 297/191; 297/117; 297/167; 297/417
[58] Field of Search ............... 297/61, 167, 168, 169, 297/191, 417, 117, 411, 115

[56] References Cited

U.S. PATENT DOCUMENTS

| 3,168,346 | 2/1965 | Rei, Jr. .......................... 297/117 X |
| 3,172,699 | 3/1965 | Naughton ....................... 297/417 X |
| 3,336,076 | 8/1967 | Mallite ............................. 297/191 |
| 3,588,172 | 6/1971 | McGregor ........................ 297/191 |
| 3,813,147 | 5/1974 | Rick ................................. 297/191 |
| 3,888,540 | 6/1975 | Protz et al. ...................... 297/417 |
| 4,040,661 | 8/1977 | Hogan et al. ..................... 297/61 |

Primary Examiner—James T. McCall
Attorney, Agent, or Firm—Martin A. Farber

[57] ABSTRACT

A vehicle seat with a pivotable backrest connected arrestably with the seat part in selectable positioning, the backrest carrying at least one seat accessory part. As a seat accessory part - carrier at least on one of the sides of the backrest a parallelogram is provided with two connecting rods extending in the longitudinal direction of the back. The parallelogram comprises a first connecting rod which is a part of the pillow carrier of the backrest, which part is pivotal about the pivot axis of the backrest, and a second connecting rod which on the one hand is articulated at an unchangeable position relative to the pivot axis of the backrest and on the other hand is articulated to a connection part of the parallelogram which in turn is pivotally connected with the first connecting rod. The seat accessory part which is to be carried is supported at least in its position of use on both connecting rods pivotal relative to the latter.

9 Claims, 5 Drawing Figures

VEHICLE SEAT

The invention relates to a vehicle seat with a pivotable backrest connected arrestably with the seat part in selectable positioning, the backrest carrying at least one seat accessory part. Herein under the term seat accessory parts, especially armrests and a table provided on the rear side of the backrest are understood.

With known vehicle seats of this type, which preferably are used in airplanes and omnibuses, the armrest either is rigidly connected with the backrest, which has the disadvantage that it changes its inclination with a change of the position of the backrest, or it is connected with the backrest by means of a catch fastening. However, this also is disadvantageous since the occupant of the seat during an adjustment of the backrest as a rulse also must adjust the armrest or the armrests and since catch fastenings noticeably increase the expense for the seat.

So far as the known vehicle seats of the introductory named type are provided with a folding table on the rear side of its backrest, this table is connected with the backrest either in the manner such that the angle which is defined by the table in the use position with the backrest, is independent on the inclination position of the backrest, or the table is carried by a linkage independent of the backrest, which linkage is rigidly connected with the seat part and thus makes the position of the table in this use position independent of the inclination position of the backrest. The first-mentioned possibility is associated with the disadvantage that the position of the table in the use position is dependent on the inclination position of the backrest, which first of all is quite disturbing when food or drink is to be placed on the table. The disadvantage of the linkage in the first place resides in that due to the relatively large length of the linkage it is difficult to achieve the very high demands on the load carrying ability of the seat, for example a carrying capacity of 70 kpd. Moreover additional measures must be met in order to guarantee placement of the table against the backrest in every inclination position of the backrest.

It is an object of the present invention to provide a vehicle seat with the most simple means permitting the fulfillment of the loading requirements, which means facilitates the attachment of at least one seat accessory part such that its position of use is independent of the inclination position of the backrest.

In accordance with the above-mentioned object, it is another object of the present invention to provide a vehicle seat of the introductory mentioned type, characterized in that as a seat accessory partcarrier (that is, a carrier for a seat accessory part), at least on one of the sides of the backrest (2) a parallelogram is provided with two connecting rods (4, 6) extending in the longitudinal direction of the back, the first connecting rod of which is a part (4) of the pillow carrier of the backrest, which part (4) is pivotal about the pivot axis of the backrest (2), and the second connecting rod (6) of which on the one hand is articulated at a non-changeable position relative to the pivot axis of the backrest and on the other hand is articulated to a connection part (9) which in turn is pivotally connected with the first connecting rod (4), and the seat accessory part (7, 8) which is to be carried is supported at least in its position of use on both connecting rods (4, 6) pivotal relative to the latter. Preferably that part of the pillow or cushion carrier of the backrest (2) which forms the first connecting rod is one of its side or lateral struts (4), since by this a minimum of additional parts is required for the parallelogram, and moreover the lateral strut has a sufficiently high load carrying ability. With such a formation of the seat it is further advantageous to provide as the econd connecting rod, a rod (6) lying spaced from the side strut (4) in the pivot plane of the side strut. By this, there results, particularly simple construction parts for the parallelogram, and moreover the acommodation of the parallelogram in the brackrest is possible without changes worth mentioning.

The expense for such a parallelogram is very small, and indeed also when a high load carrying capacity is required, since for additional parts only the second connecting rod and the connection part are required and the necessary length of the second connecting rod is comparatively small. Since the plane defined by the two upper pivot points of the parallelogram does not change with respect to its position with reference to a horizontal plane during an inclination adjustment of the backrest, because the position of both lower articulation points is independent of the inclination position of the backrest, the position of a seat accessory part carried by the parallelogram with reference to a horizontal plane is not influenced by the inclination position of the backrest. A folding table carried by the parallelogram therefore for example always retains its horizontal position in its position of use even if the user of the seat which carries the folding table changes the inclination position of the backrest. Nevertheless no additional measures need be met in order to be able to place the folding table against the rear side of the backrest in every chosen inclination position of the backrest, since the folding table is carried by the backrest.

It is also advantageous to articulate the second connecting rod (6) to the carrier part or supporting structure (3) of the seat part, the carrier part (3) bearing the pivot axis or axle of the backrest, since then this carrier part (3) forms the lower connection member of the parallelogram; thus no additional construction part is required therefor.

In a preferred embodiment form, a seat accessory part, which is formed as a folding tble provided on the rear side of a backrest, has two carrier arms projecting beyond its rear edge adjacent to the backrest, which carrier arms are articulated on the one and the other first connection rods (4), respectively, of the two parallolgrams which are provided, and the carrier arms extend beyond this articulation point in such a degree that in the use position of the folding table they engage abuttingly on an abutment (11) of the correspondingly associated second connecting rod (6). The connection between the folding table and the two parallelograms in this manner is especially simple; particularly it simultaneously forms the tilting hinge, which is necessary, in order to be able to place the folding table against the rear side of the backrest. Advantageously the abutment constitutes a pin (11) protruding from the second connecting rod (6) and lying parallel to its pivot axis, the pin projecting in the pivot range of the extension of the associated carrier arm which is coordinated thereto.

A seat accessory part formed as an armrest is preferably connected with the coordinated parallelogram in the vicinity of the rear end of the armrest at the height of the connection part (9). The connection part can then be used additionally for the connection between the armrest and the parallelogram, whereby individual parts are saved.

With a preferred embodiment, the armrest is pivotally mounted on a pivot pin (12) which also pivotally connects the connection parts (9) with the first connection rod (4). Abutment surfaces of the connection part and of the armrest, which abutment surfaces abut one another in the position of use of the armrest, guarantee in this manner that the armrest always has the same position of use independent of the inclination position of the backrest. Nevertheless the armrest can be pivoted upwardly away in the event of need without anything further.

A particularly simple embodiment of the abutment surfaces is obtained when an abutment pin (14) protruding from the connection part parallel to the pivot pin (12) at a distance from the latter projects into a channel in the armrest, which channel extends along a circular path (15) about the pivot axis of the armrest, and the two abutment surfaces are formed by the jacket or casing surface of the abutment pin and one of the end surfaces of the channel.

With the above and other objects and advantages in view, the present invention will become more clearly understood in connection with the following detailed description of a preferred embodiment, when considered with the accompanying drawings, of which:

FIG. 2 is a side view of one of the two parallelograms and parts of the arm rest as well the folding table with the backrest and seat portion partially broken away;

Figure 1:
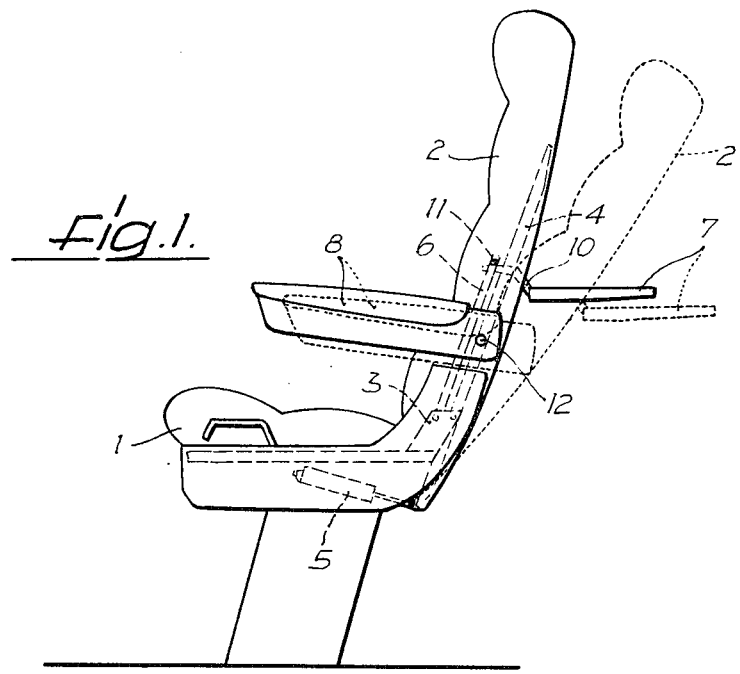
FIG. 1 is a side view of a vehicle seat in accordance with the present invention.
Figure 3:
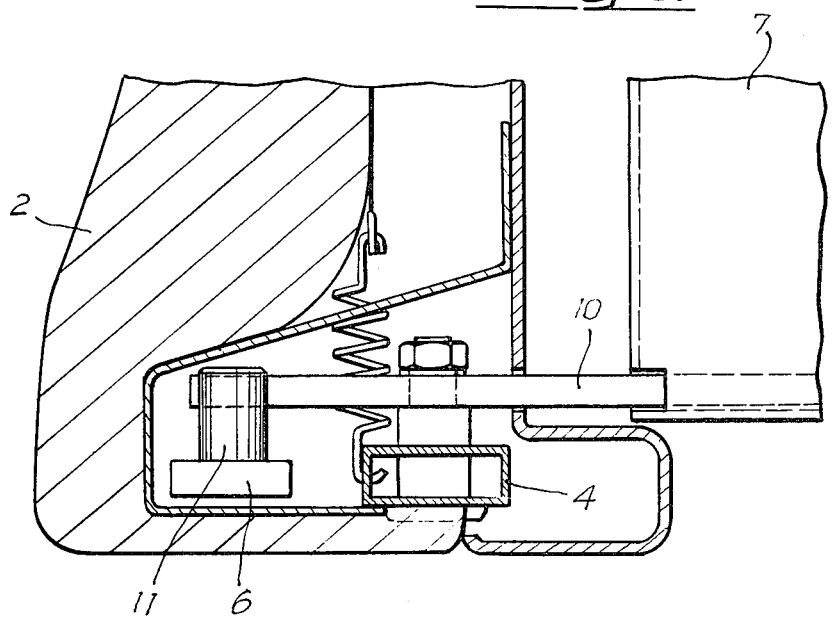
FIG. 3 is a section taken along the lines III—III of FIG. 2.
Figure 4:
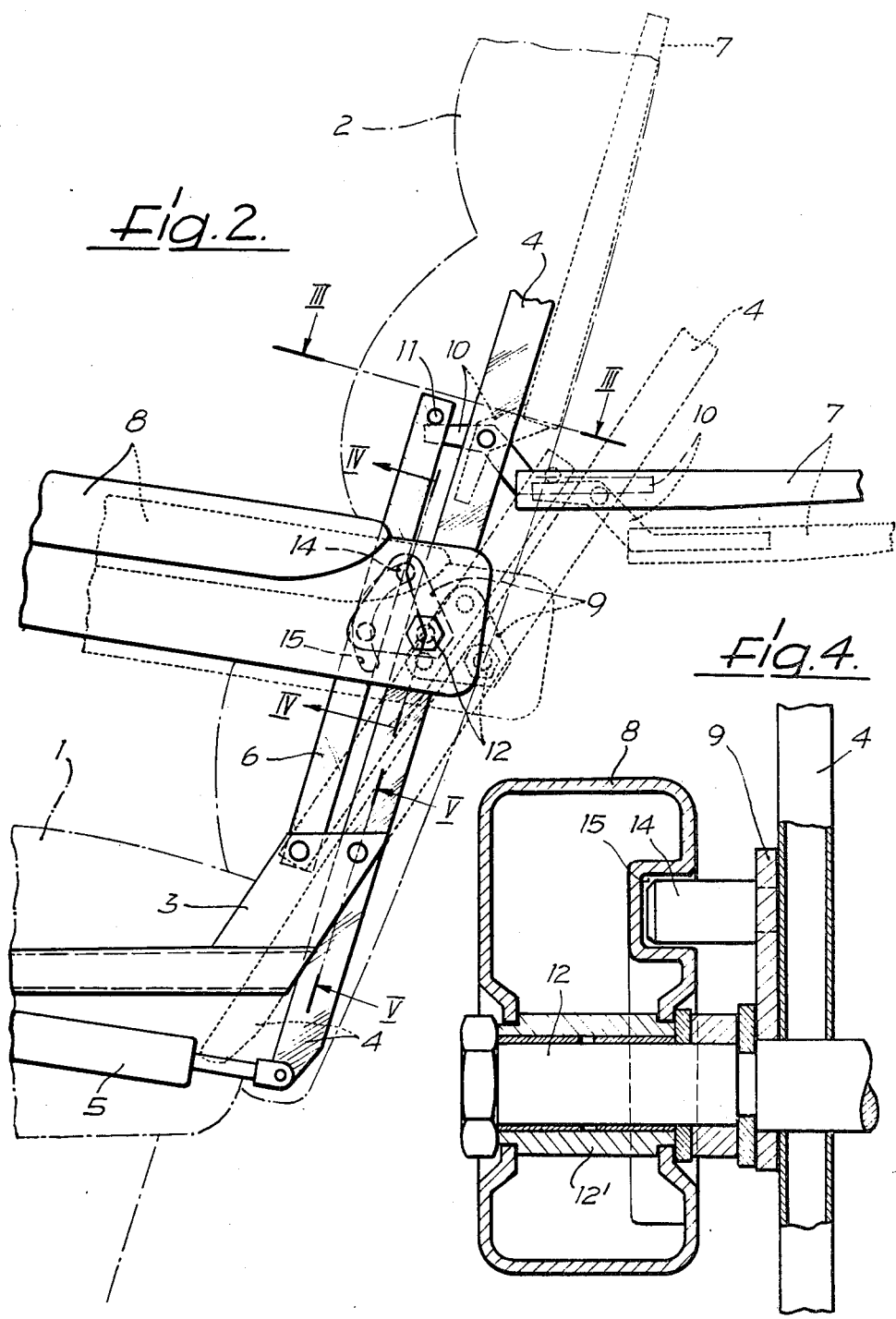
FIG. 4 is a section taken along the lines IV—IV of FIG. 2.
Figure 5:
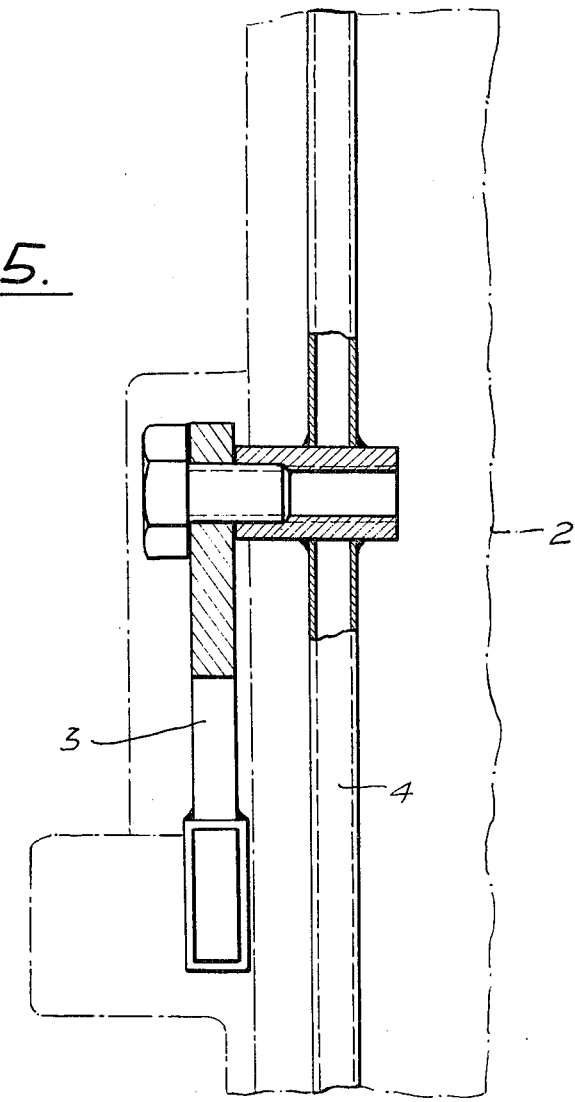
FIG. 5 is a section taken along the lines V—V of FIG. 2.

Referring now to the drawings, a vehicle seat, which is provided particularly for installation in an omnibus, however also is suitable for trains or airplanes, has a seat part characterized as a unit with the numeral 1 and a pivotal backrest designated as a unit with the numeral 2, the backrest being arrestably connected with the seat part in selectable positions. For the pivotal connection of the backrest 2 with the seat part 1, in the back on both sides of a seat pillow-carrying frame of the seat-frame of the seat part 1, respectively, a vertically oriented plate 3 is welded thereon and protrudes rearwardly as well as upwardly from the frame. One side strut 4 and the other side strut 4, respectively, of a back-frame is articulated with the same pivot axis to these plates 3 by means of one pivot bolt or pin each. The pivotal connection between the backrest 2 and the seat part 1 could also be achieved, for example, by means of two pivot fastenings, braces or hinges.

In order to be able to arrest and hold the backrest 2 in the selected inclination position, one of the side struts 4 is extended downwardly beyond its pivot pin. The free end of this extension is connected with a piston via a connecting or tie rod, the piston being operatively disposed in a cylinder 5, the latter being pivotally mounted laterally on the seat frame. The air inlet and air outlet is controlled via a valve actuatable by means of a handle. Also this arresting or fixing unit could be formed in other ways.

One flat rod 6 each is arranged in front of the two side struts 4 of the backrest frame, each rod 6 lying in the pivot plane of the respective side struts 4. The lower end of each flat rod 6 is articulated to the corresponding plate 3 spaced in front of the articulation point of the side strut 4. From this articulation point of the flat rods 6, each of the two identically formed and arranged flat rods 6 which is disposed parallel to the lateral strut 4, extends still upwardly to a height which is somewhat higher than the level of a folding table 7 provided on the rear side of the backrest 2. At a distance from the upper end of the flat rods 6 at a height corresponding to the height at the rear end of two identically formed armrests 8 (which armrests are provided on both sides of the seat), each of the two flat rods 6 is articulated to one connection part 9, which connection part is formed as a plate having a triangular-like contour in the illustrated embodiment. At a distance from the pivot axis of the backrest 2, which distance is equal to the distance of the upper articulation point from the lower articulation point of the flat rod 6, each of the two connection parts 9 is articulated to the corresponding coordinated lateral strut 4. On both sides of the backrest 2, consequently, two identically formed parallelograms are present, the first link or connecting rod thereof being formed by the lateral strut 4 and its second connecting rod or link being formed by the corresponding coordinated flat rod 6. The two flat rods 6, likewise as the two lateral struts 4, are covered toward the front, to the side and toward the rear.

Only slightly underneath the upper end of the flat rods 6, at the same height, respectively, one off-set of angularly bent-off carrier arm 10 each is articulated on the inner side of the two lateral struts 4. The two identically formed carrier arms 10 carry the folding table 7 and project beyond its rear edge adjacent to the backrest 2. Moreover they extend out beyond the pivot point on the lateral strut 4 up to the flat rod 6. Both of the flat rods 6 carry at the same height in the vicinity of their respective upper ends one inwardly projecting pin 11 each. The carrier arms 10 abuttingly engage on the lower side of these two pins 11, respectively, when the folding table 7 is in its position of use, in which position it lies in a horizontal plane in the illustrated embodiment.

If the folding table 7 is not used it is then pivoted upwardly until it abuts on the rear side of the backrest 2, the backrest 2 for this purpose being formed on its rear side with a recess which is adjusted correspondingly or complementary to the size of the folding table 7, as well as being provided with a holding device for the folding table 7 in the upper edge of this recess. With this pivotal movement the free end section of the carrier arm 10 pivots away from the pin 11 into a position parallel to the coordinated or associated lateral strut 4 (as illustrated in dashed lines). Since the plane which is defined by the pin 11 and the tilting axis of the folding table 7, with respect to its inclination position, only depends on the inclination of that plane which is determined by the pivot axis of the backrest 2 and the lower articulation point of the flat rod 6, a pivoting of the backrest 2 produces no change of the horizontal position of the folding table 7 in its use position, but only an insignificant change of height (compare the dashed line position in FIG. 1).

The pivot axis which connects the connection part 9 with the associated lateral strut 4 coordinated thereto, is formed as a pivot pin 12, which pin 12 projects through and outwardly beyond the connection part 9 and carries the associated armrest 8 which is coordinated thereto.

For this purpose the armrest 8 is provided in the vicinity of its rear end with a bushing or sleeve 12' which is rotatably seated on the pivot pin 12, however, axially non-displaceable. If only one armrest 8 is provided, as this can be the case for example when a plurality of seats are assembled into a row of seats, then evidently only one projecting pivot pin 12 is present on one of the sides of the backrest.

An abutment or limit stop pin 14 engages in a groove or channel 15 of the armrest 8. The abutment pin 14 protrudes outwardly from the connection part 9, is arranged spaced from the pivot pin 12 and lies parallel to the latter. The channel 15 is formed in the armrest 8 on the side facing the abutment pin 14 and extends along a circular arc, the radius of which is equal to the distance of the abutment pin 14 from the pivot pin 12. The length of this channel is selected such that the abutment pin 14 abuts at its upper end when the armrest is disposed in the desired use position, and abuts at its lower end when the armrest is folded into a position in which it lies laterally adjacent to the backrest. The jacket or outer shell surface of the abutment pin 14 and the end surfaces of the channel 15 thus form cooperative abutment surfaces.

The inclination position of each of the two armrests 8 does not change with an inclination adjustment of the backrest 2 since the connection parts 9 are also retained in their inclination position during a backrest adjustment. Only an insignificant height displacement of the armrests 8 is associated with an inclination adjustment of the backrest.

While we have disclosed one embodiment of the present invention it is to be understood that this embodiment is given by example only and not in a limiting sense.

We claim:

1. A vehicle seat comprising
a seat part,
a backrest pivotally connected with said seat part at a first pivot axis and being arrestable in selectable positions, said backrest includes a pillow carrier including lateral struts,
at least one armrest and folding table, respectively, operatively carried on said backrest,
  a carrier of said armrest and folding table, respectively, constituting at least one parallelogram, the latter having two connecting rods extending in a longitudinal direction of said backrest, said at least one parallelogram being disposed on at least one lateral side of said backrest,
  said two connecting rods comprising a first connecting rod constituting a part of said pillow carrier of said backrest, said latter mentioned part being pivotally mounted about said pivot axis of said backrest, a second connecting rod being articulated to said seat part at a second pivot axis at an unchangeable position relative to said first pivot axis of said backrest,
  a connection part constituting part of said parallelogram being articulated to said second connecting rod, said connection part being pivotally connected with said first connecting rod,
  said armrest and folding table, respectively, being supported at least in a use position thereof on both of said connecting rods and swingably relative to the latter,
  said part of said pillow carrier of said backrest forming said first connecting rod constitutes one of said lateral struts of said backrest,
  said second connecting rod constitutes a rod disposed in a pivot plane of said lateral strut and uniformly spaced parallel from the latter.

2. The vehicle seat as set forth in claim 1, further comprising
a supporting structural part of said seat part bearing said pivot axis of said backrest,
said second connecting rod is articulated on said supporting structural part of said seat part.

3. The vehicle seat as set forth in claim 1, wherein
said folding table is provided on a rear side of said backrest, said folding table includes carrier arms projecting beyond a rear edge thereof adjacent to said backrest,
two of said at least one parallelogram, each disposed on one side of said backrest, respectively,
said second connecting rod of each of said two parallelograms has an abutment,
said carrier arms, respectively, are articulated at a pivot point on said first connecting rod of each of said two parallelograms, respectively, and extend beyond said pivot point to an extent such that said carrier arms abut said abutment of a coordinated of said second connecting rod of each of said two parallelograms, respectively, in the use of position of said folding table.

4. A vehicle seat comprising
a seat part,
a backrest pivotally connected with said seat part at a first pivot axis and being arrestable in selectable positions, said backrest includes a pillow carrier,
at least one seat accessory part operatively carried on said backrest,
a carrier of said seat accessory part constituting at least one parallelogram, the latter having two connecting rods extending in a longitudinal direction of said backrest, said at least one parallelogram being disposed at least one side of said backrest,
said two connecting rods comprising a first connecting rod constituting a part of said pillow carrier of said backrest, said latter mentioned part being pivotally mounted about said pivot axis of said backrest, a second connecting rod being articulated at an unchangeable position relative to said pivot axis of the backrest, a connection part being articulated to said second connecting rod, said connection part being pivotally connected with said first connecting rod,
said seat accessory part being supported at least in a use position thereof on both of said connecting rods swingably relative to the latter,
said seat accessory part constitutes a folding table provided on a rear side of said backrest, said accessory part includes carrier arms projecting beyond a rear edge thereof adjacent to said backrest,
two of said at least one parallelogram, each disposed on one side of said backrest, respectively,
said second connecting rod of each of said two parallelograms has an abutment,
said carrier arms, respectively, are articulated at a pivot point on said first connecting rod of each of said two parallelograms, respectively, and extend beyond said pivot point to an extent such that said carrier arms abut said abutment of a coordinated of said second connecting rod of each of said two parallelograms, respectively, in the use of position of said folding table, said abutment constitutes a pin, said pin protrudes from said second connecting rod and is disposed parallel to a pivot axis of said second connecting rod.

5. The vehicle as set forth in claim 1, wherein said armrest is connected with a coordinated of said at least one parallelogram in a vicinity of a rear end of said armrest at the height of said connection part.

6. The vehicle seat as set forth in claim 5, further comprising a pivot pin connects said connection part with said first connecting rod, said armrest is pivotally mounted on said pivot pin, said connection part and said armrest are formed with cooperative abutment surfaces, respectively, said abutment surfaces abut one another in the use position use of said armrest.

7. A vehicle seat comprising a seat part, a backrest pivotally connected with said seat part at a first pivot axis and being arrestable in selectable positions, said backrest includes a pillow carrier, at least one seat accessory part operatively carried on said backrest, a carrier of said seat accessory part constituting at least one parallelogram, the latter having two connecting rods extending in a longitudinal direction of said backrest, said at least one parallelogram being disposed on at least one side of said backrest, said two connecting rods comprising a first connecting rod constituting a part of said pillow carrier of said backrest, said latter mentioned part being pivotally mounted about said pivot axis of said backrest, a second connecting rod being articulated at an unchangeable position relative to said pivot axis of the backrest, a connection part being articulated to said second connecting rod, said connection part being pivotally connected with said first connecting rod, said seat accessory part being supported at least in a use position thereof on both of said connecting rods swingably relative to the latter, said seat accessory part is formed as an armrest, said seat accessory part is connected with a coordinated of said at least one parallelogram in a vicinity of a rear end of said accessory part at the height of said connection part, a pivot pin connects said connection part with said first connecting rod, said armrest is pivotally mounted on said pivot pin, said connection part and said armrest are formed with cooperative abutment surfaces, respectively, said abutment surfaces abut one another in the use position use of said armrest, said armrest is formed with a channel extending along a circular path disposed about said pivot pin, the latter constituting the pivot axis of said armrest, said channel defines end surfaces, an abutment pin protrudes from said connection part and is parallel to said pivot pin and spaced therefrom, said abutment pin projects in said channel in said armrest, said abutment pin defines a casing surface, both said abutment surfaces are formed by said casing surface of said abutment pin and one of said end surfaces of said channel.

8. The vehicle as set forth in claim 2, wherein said supporting structural part comprises a rearwardly vertically projecting plate immoveably connected to a rear portion of said seat part, said first and second pivot axes are formed on said plate and are immoveable, said plate forming an immoveable part of said parallelogram.

9. The vehicle seat as set forth in claim 8, said second connecting rod is disposed in front of said first connecting rod, said first connecting rod extends downwardly beyond said first pivot axis defining a lower free end, means for adjusting and arresting said backrest in said selectable positions is connected to said lower free end and is mounted on said seat part.

* * * * *